United States Patent [19]
Kühl et al.

[11] 3,917,461
[45] Nov. 4, 1975

[54] APPARATUS FOR PRODUCTION OF GASEOUS PRODUCTS

[75] Inventors: Dieter Kühl, Rathsberger, Germany; Manfredo Marchetto, Viale Oleandri, Italy

[73] Assignee: Siemens Aktiengesellschaft, Munich, Germany

[22] Filed: Feb. 15, 1973

[21] Appl. No.: 332,654

[30] Foreign Application Priority Data
Feb. 16, 1972 Germany............................ 2207274
Feb. 16, 1972 Germany............................ 2207273

[52] U.S. Cl................ 23/288 A; 23/253 A; 23/260; 23/282; 423/579; 423/659
[51] Int. Cl............................. B01j 7/02; B01j 9/04
[58] Field of Search ..... 23/282, 288 A, 253 A, 260, 23/281; 423/579, 659; 48/37; 137/2, 7, 571

[56] References Cited
UNITED STATES PATENTS

| | | | |
|---|---|---|---|
| 618,299 | 1/1899 | Sprague | 48/37 |
| 801,061 | 10/1905 | Chamberlin | 48/37 |
| 1,245,807 | 11/1917 | Shaw | 23/282 |
| 1,578,942 | 3/1926 | Warrick | 23/282 |
| 2,541,799 | 2/1951 | White | 137/2 X |
| 3,268,298 | 8/1966 | Costa et al. | 23/282 |
| 3,594,232 | 7/1971 | Spahrbier | 23/282 X |

Primary Examiner—Morris O. Wolk
Assistant Examiner—Barry I. Hollander
Attorney, Agent, or Firm—Kenyon & Kenyon Reilly Carr & Chapin

[57] ABSTRACT

Apparatus for producing a gas from a liquid decomposable into the gas, comprising first and second fluid-tight chambers, a gravity supply source of the liquid, and connected to the first chamber for gravity flow thereto through a check valve preventing reverse flow, the first chamber being connected for gravity liquid flow to the second chamber through a check valve preventing reverse flow, means for enclosing fluid-tightly and decomposing the liquid to the gas under pressure and connected to receive a gravity liquid flow from the second chamber through a pressure-responsive flow control valve and having a gas output conduit for serving a consumer, a branch conduit connected to this output conduit and to the second chamber and to said flow control valve to render the latter responsive to the branch line's pressure, and means responsive to the liquid level in the first chamber for controlling the gravity flow thereto from said source to maintain a predetermined liquid level in this first chamber.

24 Claims, 4 Drawing Figures

APPARATUS FOR PRODUCTION OF GASEOUS PRODUCTS

BACKGROUND OF THE INVENTION

The invention relates to a method and apparatus for the production of gaseous products by the decomposition of liquids. More particularly, the invention relates to the production of oxygen by the catalytic decomposition of hydrogen peroxide.

In fuel cell batteries, a current is generated by an electrochemical reaction between a fuel and an oxidant. For batteries which are to operate without maintenance over extended periods of time, liquid reactants are preferred over gaseous reactants since it is a simple matter to store liquids in tanks without maintaining the tanks under pressure. Furthermore, the energy density (available energy per unit) of liquids is many times higher than that of gases.

Oxygen, as present in air, has frequently been used as the oxidant for such reactions. If, however, a fuel cell battery is to operate in the absence of air, for instance, in the vacuum of outer space, the oxidizing agent must otherwise be made available to the battery. Hydrogen peroxide, a liquid, is useful for this purpose because of its high energy density.

Although hydrogen peroxide can be reacted directly as an oxidant in fuel cells and fuel cell batteries, better efficiency is obtained if the hydrogen peroxide is decomposed into oxygen and water; and the oxygen thus formed is then supplied as the oxidant to the fuel cell or the fuel cell battery. The decomposition reaction for hydrogen peroxide, which is a highly exothermic reaction in the presence of catalysts, takes place according to the following equation:

$$H_2O_2 \rightarrow H_2O + \tfrac{1}{2}O_2$$

Various methods and apparatus for carrying out this decomposition reaction, i.e., the production of oxygen from hydrogen peroxide are known. See for instance, Schumb, Satterfield, Wentworth, "Hydrogen Peroxide" Reinhold Publishing Corporation, New York, 1955 p. 602 and following.

FIELD OF THE INVENTION

However, the method and the apparatus of the prior art which were used to carry out those processes suffer from the disadvantage that they are not self-sufficient energy-wise. They require auxiliary energy such as electric energy for pumps to transfer the hydrogen peroxide. This fact has a detrimental effect, particularly in fuel cell batteries, as their efficiency and economics are diminished by energy-consuming auxiliary units.

Accordingly, it is an object of the invention to provide a method and apparatus for the production of gaseous products by the decomposition of liquids, and in particular, for the production of oxygen through catalytic decomposition of hydrogen peroxide without the need for auxiliary energy.

SUMMARY OF THE INVENTION

Briefly, the invention provides a method and apparatus wherein liquid is initially fed from a supply chamber through an intermediate chamber, to a decomposition chamber or unit. The gas pressure resulting from the decomposition of the liquid in the decomposition unit is used to control liquid levels in the apparatus. By this means, the level of liquid in the intermediate chamber and in the decomposition unit is controlled. As hereinafter more fully described, the intermediate chamber is divided into two sections which retain the liquid prior to being fed to the decomposition unit.

The process does not require extraneous energy and is therefore particularly economical. In addition, gaseous products are produced in the course of the decomposition reaction which regulate the flow of the liquid to the decomposition unit. Finally, the method offers the advantage that the supply tank for the liquid can be maintained at ambient pressures.

As already explained, the method according to the invention is particularly useful for the manufacture of oxygen by catalytic decomposition of hydrogen peroxide. However, it can also be used for the catalytic decomposition of other liquids, for instance, producing hydrogen from hydrazine. Other applications include the production of hydrogen by reaction of metals, such as aluminum, with water or alkaline solutions, or reaction of hydrides, such as a sodium borohydride, with water or acid.

In the method according to the invention, during the start-up period, i.e., the time interval between the start of the decomposition reaction and the period of operation proper, the following process steps take place:

In the first phase, the supply of liquid from the intermediate tank to the decomposition unit is cut off as a function of the rising pressure of the stored gaseous product in the decomposition unit. The liquid continues to be fed from the supply tank to the intermediate tank.

In the second phase, the intermediate tank is filled with liquid, and is placed in communication with the prevailing gas pressure in the decomposition unit. This causes liquid to again be fed from the intermediate tank to the decomposition unit where it is decomposed. At the same time, the supply of liquid from the supply tank to the intermediate tank is shut off.

In the third phase, the supply of liquid from the intermediate tank to the decomposition unit is once more shut off as a function of the increasing gas pressure.

The start-up period can also proceed according to the following phases:

In the first phase, the second chamber of the intermediate tank is placed in communication with the prevailing gas pressure in the decomposition unit causing the supply of the liquid from the first chamber of the intermediate tank to the second chamber to be shut off as a function of the rising pressure of the gaseous medium. At the same time liquid continues to be conducted from the supply tank to the first chamber of the intermediate tank as well as from the second chamber of the intermediate tank to the decomposition unit where it is decomposed to form gas.

In the second phase, the supply of liquid to the decomposition unit is shut off as a function of the rising gas pressure in the decomposition unit, while the first chamber of the intermediate tank continues to be filled with liquid from the supply tank.

After the first chamber of the intermediate tank is filled with liquid, the first chamber is likewise exposed, in a third phase, to the prevailing gas pressure. At this point, the liquid is fed from the first chamber to the second chamber of the intermediate tank, while the supply of liquid from the supply tank to the intermediate tank is shut off as a function of the prevailing gas pressure.

It is advantageous to purify the gaseous product formed in the decomposition unit before it is used. Purification comprises, particularly in the case of exothermic reactions which release water, treatment of the gaseous product in a heat exchanger (to condense the water) as well as in a water separator.

BRIEF DESCRIPTION OF THE DRAWINGS

The invention will be explained further by means of an example of an embodiment which shows the production of oxygen through catalytic decomposition of hydrogen peroxide, and with reference to several figures.

Figure 1:
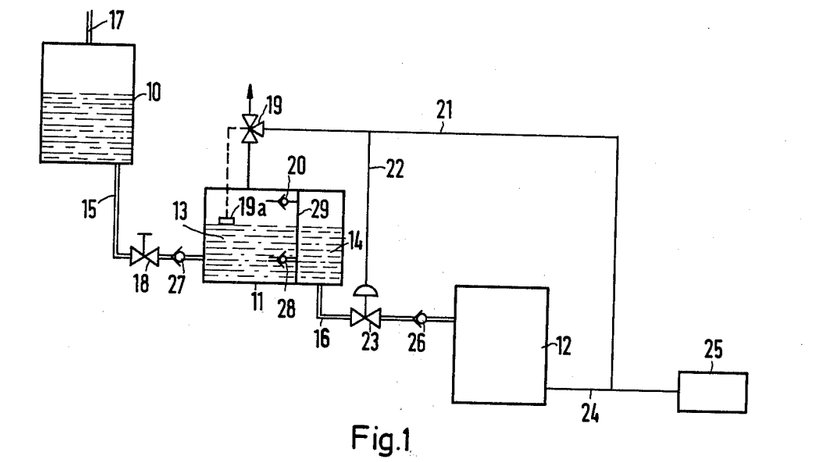
FIG. 1 is a schematic flow diagram of apparatus for practicing the invention.

In FIG. 1 there is schematically shown an example of an embodiment of the apparatus for carrying out the process of this invention. The reference numerals 10, 11 and 12 designate, respectively, a supply tank or chamber for the liquid to be decomposed, an intermediate tank or chamber and a decomposition unit or chamber where the liquid undergoes the decomposition reaction to produce the gaseous product. Supply tank 10 is positioned at a higher elevation than intermediate tank 11. Decomposition unit 12 is positioned at a lower elevation than the intermediate tank 11. Intermediate tank 11 is divided into two chambers 13 and 14 by partition 29. First chamber 13 of intermediate tank 11 is connected to supply tank 10 by conduit line 15. Second chamber 14 is connected to decomposition unit 12 by conduit line 16. The liquid passes from first chamber 13 to second chamber 14 of intermediate tank 11 through check valve 28 for the liquid, located at partition 29. Supply tank 10 can be filled with the liquid to be decomposed, for instance, a concentrated aqueous hydrogen peroxide solution, via conduit line 17. Supply tank 10 may be maintained at ambient pressure through conduit line 17.

The process is performed by opening shut-off valve 18 in line 15. Due to hydrostatic pressure resulting from the difference in elevation, liquid flows from supply tank 10 through line 15 into intermediate tank 11 and from intermediate tank 11 via line 16 into decomposition unit 12. At least a portion of the gaseous product of decomposition is used to regulate the liquid flow from the supply tank, through the intermediate tank to the decomposition unit. At the appropriate time during the process, and as more fully explained hereinafter, intermediate tank 11 is vented during the process in order to return intermediate tank 11 to ambient pressure. The venting takes place in such a manner that first chamber 13 of intermediate tank 11 is in communication with ambient pressure through three-way valve 19, while check valve 20 for the gas between second chamber 14 and first chamber 13 of intermediate tank 11 permits pressure equalization between these two chambers. Three-way valve 19 is arranged in pressure equalization line 21 which connects first chamber 13 of intermediate tank 11 with output line 24 of decomposition unit 12. Flow control valve 23 is connected via line 22 to pressure equalization line 21. It is arranged between intermediate tank 11 and decomposition unit 12. Consumer 25 (which may be the battery hereinbefore referred to) is connected to output line 24 of decomposition unit 12.

The liquid flowing into decomposition unit 12 is decomposed; for practical reasons consumer 25 is not connected to decomposition unit 12 when the system is first put into operation. Therefore, the gaseous product formed in decomposition unit 12 is not consumed but stored. Accordingly, increasing pressure develops in decomposition unit 12 as well as in output line 24 of decomposition unit 12 and in pressure equalization line 21. Because of this rising gas pressure check valve 26 located in line 16 between intermediate tank 11 and decomposition unit 12 closes off the supply liquid so that the supply of liquid from intermediate tank 11 to decomposition unit 12 is shut off; and the decomposition stops.

In the meantime, the supply of liquid from supply tank 10 to intermediate tank 11 continues. When intermediate tank 11 is filled with liquid, i.e., when the liquid level has reached a given height, three-way valve 19 is switched to interrupt the connection from chamber 13 to the ambient atmosphere. Three-way valve 19 is actuated by float 19a positioned in first chamber 13 of intermediate tank 11. By means of switching three-way valve 19 first chamber 13 and second chamber 14 are in communication through check valve 20, i.e., the entire intermediate tank 11 is in communication with pressure equalization line 21. Intermediate tank 11 is thereby put into communication with the pressure prevailing in the decomposition unit and lines thereof. As a result, the supply of liquid from supply tank 10 to intermediate tank 11 is interrupted by the closing of check valve 27 located in line 15. At the same time liquid again is permitted to flow from intermediate tank 11 into decomposition unit 12 since check valve 26 in line 16 again opens.

Decomposition of the liquid now takes place again in decomposition unit 12 and the gas pressure in the system rises once more. When the gas pressure reaches a given value, flow control valve 23 in line 16 between intermediate tank 11 and decomposition unit 12 and which is connected to pressure equalization line 21 by means of line 22, closes and shuts off the supply of liquid to decomposition unit 12. The pressure at which valve 23 closes can be predetermined.

Flow control valves which are known can be used for valve 23. Also, a pneumatically actuated flow control valve, which will be described hereinafter in greater detail, can also be used. Valve 23 has three chambers within a housing, of which a first chamber is intended to receive the controlling medium, a second chamber is intended to receive the medium to be controlled, and the third chamber which is situated between these two chambers, is hermetically sealed from the other two chambers by movable diaphragms. The effective area of the diaphragm separating the chamber for the controlling medium is larger than the effective area of the diaphragm separating the chamber for the medium to be controlled. The two diaphragms are rigidly connected to each other for transmission of forces. The first chamber has an opening for feeding the controlling medium. At least two openings are provided for passing the medium to be controlled through the second chamber. The free flow cross-sectional area of the medium to be controlled in the second chamber can be changed by changing the location of the movable diaphragm between this chamber and the third chamber. The flow control valve closes, for example, at a pressure of about 40 N/cm$^2$ (approx. 4 kg/cm$^2$).

The operating period is begun by connecting consumer 25 to decomposition unit 12 through its output line 24. The pressure drops in the entire system due to consumption of the gaseous product in consumer 25 causing pneumatically controlled flow control valve 23 to again open. Liquid again flows from intermediate tank 11 to decomposition unit 12 and the decomposition reaction continuously supplies gaseous product to consumer 25.

In general, the input flow of liquid to decomposition unit 12 need not be continuous and accordingly the decomposition reaction need not be continuous. As explained, while flow control valve 23 is open, check valve 26 opens and closes periodically due to pressure fluctuations over short time intervals (a few seconds).

In the first part of the operating period liquid is fed continuously from intermediate tank 11 to decomposition unit 12 and the supply of liquid to intermediate tank 11 remains interrupted since check valve 27 is closed due to the pressure prevailing in the system. The amount of liquid in intermediate tank 11 therefore decreases continuously. When the liquid level has reached a minimum, three-way valve 19 is switched by float 19a in first chamber 13, so that first chamber 13 of intermediate tank 11 is vented by being placed in communication with the ambient atmosphere. The gas located therein is decompressed. Due to the absence of gas pressure check valve 27 then opens in response to the hydrostatic pressure head of liquid in supply tank 10. Liquid from supply tank 10 flows into first chamber 13 of intermediate tank 11. During this time second chamber 14 of intermediate tank 11 remains pressurized due to the gas pressure prevailing in the system. Check valve 20 for gas as well as check valve 28 for liquid which are located between first chamber 13 and second chamber 14 of the intermediate tank are closed. Since check valve 28 is closed, the liquid supply from first chamber 13 to second chamber 14 is also closed off. At the same time during this part of the operation, i.e., while first chamber 13 of intermediate tank 11 is being filled with liquid, liquid continues to flow from second chamber 14 of intermediate tank 11 to decomposition unit 12, so that the decomposition reaction is maintained. As was already indicated, this is accomplished by the fact that in second chamber 14 gas pressure prevails which causes the liquid to flow into decomposition unit 12. This gas pressure or the existing gas cushion is sufficient to bridge the duration of the filling operation of first chamber 13 of intermediate tank 11 which normally takes several minutes.

When first chamber 13 is again filled with liquid, i.e., when the predetermined liquid level has been reached, three-way valve 19 is switched over by float 19a and first chamber 13 of intermediate tank 11 is again subjected to the gas pressure prevailing in the entire system via pressure equalization line 21. Because of the pressure in first chamber 13, check valve 27 closes and the flow of liquid from supply tank 10 to intermediate tank 11 is shut off. Because of the pressure equalization between first chamber 13 and second chamber 14 of intermediate tank 11, check valves 20 and 28 open, permitting liquid to pass from first chamber 13 to second chamber 14 through check valve 28, from where it flows to decomposition unit 12.

During the continuous operation of the apparatus, according to the invention, the last-mentioned operational sequences (process stages) are repeated periodically because of the required replenishment of intermediate tank 11. The system can be shut down by closing shut-off valve 18.

The system can also be started up with consumer 25 connected. However, consumer 25 should not consume a greater proportion of the gaseous product formed than would preclude the remaining gases from providing sufficient pressure to close check valve 26 some time after putting the system into operation.

The catalytic decomposition of hydrogen peroxide (into water and oxygen) is a highly exothermic reaction. As the amount of heat liberated in this reaction is considerably greater than the heat of vaporization of the reaction water, temperatures may be reached during decomposition which are above the boiling point of water. For an adiabatic and complete decomposition reaction, a temperature of about 1000°C. at normal pressure is calculated if 100% hydrogen peroxide is used. In reality, however, this temperature is not reached since the reaction is not adiabatic and the hydrogen peroxide is usually used only in an aqueous solution. However, when using hydrogen peroxide solutions both the reaction water and the water contained in the hydrogen peroxide solution are evaporated by the developed heat. Investigations have shown that only when aqueous solutions of at least 65% hydrogen peroxide are used is there complete evaporation of the water (reaction and solution water). Accordingly, it is advantageous to use hydrogen peroxide solutions with a hydrogen peroxide content of more than 65% by weight for production of oxygen through decomposition of hydrogen peroxide. Within this range a highly economical method is obtained, due to the substantially complete removal of water.

Aqueous hydrogen peroxide solutions do not explode in the liquid phase. However, it is possible to trigger explosions in gases or vapors which contain hydrogen peroxide. The lower explosion limit is about 10 N/cm$^2$ (approx. 1 kg/cm$^2$) with a content of about 26% by volume of hydrogen peroxide in the gaseous phase. Such a hydrogen peroxide concentration can develop only over boiling solutions with a content of more than 74% by weight of hydrogen peroxide. For safety reasons, hydrogen peroxide solutions with a content of less than 74% by weight are therefore used for decomposition in the present invention. Accordingly, the preferred upper and lower limit for the hydrogen peroxide content is from 65% to about 74% by weight. Commercially available 70% aqueous solutions of hydrogen peroxide can be used.

High-concentration hydrogen peroxide solutions in pure condition are very stable, but their stability decreases with increasing dilution. However, minimum self-decomposition is obtained at a pH value in the region of about 4. Because of the high sensitivity of hydrogen peroxide to the smallest proportion of metal ions, particularly $Fe^{3+}$, $Cu^{2+}$ and $Cr^{3+}$, a stabilizer is usually added to hydrogen peroxide solutions. For example, stabilizers known in the art include sodium stannate, sodium pyrophosphate or dipicolinic acid. The stabilizers maintain the pH value in the optimal range; inactivate small quantities of substances which may catalyze decomposition; and, keep the surface of the storage tanks passive with respect to initiation of the decomposition reaction. It is believed that the ions which catalyze decomposition are inactivated by the formation of complexes or through adsorption by colloidal hydroxides.

Many catalysts are known which accelerate the decomposition of hydrogen peroxide, particularly metals such as gold, silver and platinum; oxides such as manganese dioxide($MnO_2$); and salts such as iron, chromium and copper salts. A particularly well-suited catalyst is a mixed oxide catalyst consisting of oxides of the metals manganese, cobalt, copper, silver and lead and is disclosed in our U.S. Patent Application entitled "Method and Composition for Catalytic Decomposition of Hydrogen Peroxide" Ser. No. 330,642, filed Feb. 8, 1973. Particularly advantageous in this connection is a catalyst which contains as oxides, 24.0% by weight of manganese, 5.5% by weight of cobalt, 14.4% by weight of copper, 11.5% by weight of silver and 44.6% by weight of lead.

Other decomposition catalysts may be used to carry out other decomposition reactions. Raney nickel can serve as the decomposition catalyst for the catalytic decomposition of hydrazine to produce hydrogen.

Figure 2:
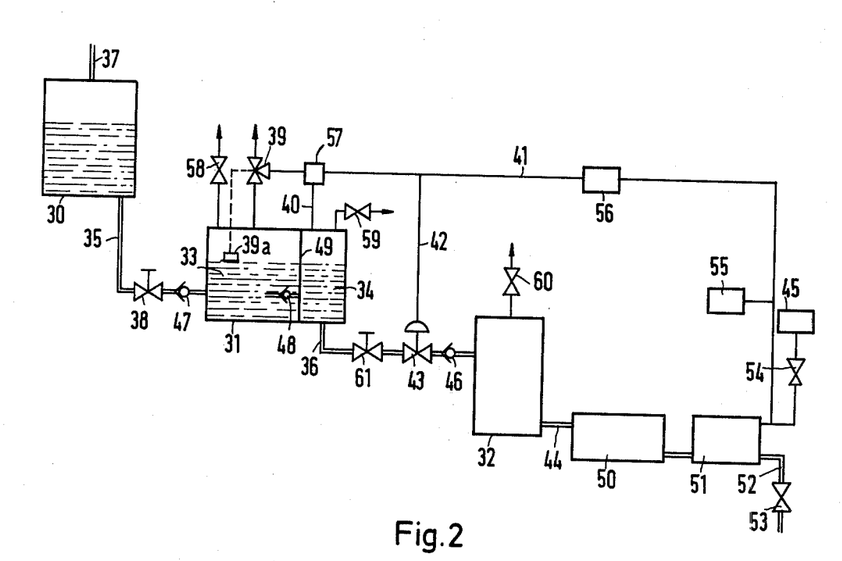
FIG. 2 is a schematic flow diagram of another embodiment for practicing the invention.

Decomposition of high-concentration hydrogen peroxide solutions by heterogeneous catalysts in the liquid phase may be carried out in a decomposition apparatus which advantageously permits the following functions to occur: Decomposition of the hydrogen peroxide; cooling of the reaction products formed; separation of the water from the oxygen; and, removal of the water. Such a decomposition apparatus, or i.e., an oxygen generator, is shown in FIG. 2. It comprises in addition to the decomposition unit, supply and intermediate tanks, a heat exchanger and a water separator.

Supply tank 30 for the hydrogen peroxide solution, which can be charged via line 37, is connected to first chamber 33 of intermediate tank 31 via line 35 in which shut-off valve 38 and a check valve 47 are arranged. The hydrogen peroxide solution in chamber 33 enters second chamber 34 of intermediate tank 31 by way of check valve 48 for liquid and reaches decomposition unit 32 via line 36. Shut-off valve 61, flow control valve 43 and check valve 46 are located in line 36.

In decomposition unit 32 the hydrogen peroxide is catalytically decomposed into oxygen and water. The mixed oxide catalyst can, for example, be used as the decomposition catalyst. The reaction products of the decomposition reaction, namely, water and oxygen, leave decomposition unit 32 via output line 44 essentially as an oxygen-water vapor mixture. This mixture enters heat exchanger (or cooling unit) 50, in which the water vapor is condensed. The water and oxygen are subsequently passed into water separator 51, in which the water is separated from the oxygen. The water is removed from water separator 51 via line 52 in which valve 53 is located. The water may be fed into a storage tank (not shown). The oxygen leaving water separator 51 is fed to consumer 45 through pressure reduction valve 54.

Part of the oxygen is diverted and is used to generate gas pressure in pressure equalization line 41. Line 41 connects output line 44 of decomposition unit 32 with chamber 33 of intermediate tank 31. Gas reservoir 55 is located in pressure equalization line 41 which serves as a storage tank for the oxygen. Such a gas reservoir is used to advantage if large quantities of gas are generated in the decomposition unit.

The operation of the gas reservoir is as follows. When the rate of gas formation in the decomposition unit decreases, for instance, due to a decrease in the flow rate of hydrogen peroxide solution to the decomposition unit, the gas reservoir supplies gas to the consumer, so that extensive pressure fluctuations are avoided in the consumer, such as a battery.

In pressure equalization line 41 there can also be located gas filter 56 which acts to remove dust particles or the like from the gas line. Dust particles may enter the gas stream from the decomposition unit (from the catalyst or the catalyst carrier) or from the heat exchanger (from the asbestos used therein). Filter 56 may, for example, contain polypropylene felt 1 mm thick.

Volume control valve 43 is connected to pressure equalization line 41 via line 42. In pressure equalization line 41 there is located, adjacent to first chamber 33, three-way valve 39, which is regulated by float 39a arranged in first chamber 33 of intermediate tank 31. Second chamber 34 of intermediate tank 31, which is separated from first chamber 33 by partition 49, is connected via line 40 to pressure equalization line 41. Line 40 opens into pressure equalization line 41 at a point which is situated between three-way valve 39 and the junction of line 42 and pressure equalization line 41. In pressure equalization line 41 there is advantageously located overflow safety device 57 at its junction with line 40 or between the junctions of line 41 with lines 40 and line 42. In the event of trouble in the process, the overflow safety device prevents hydrogen peroxide solution from getting from intermediate tank 31 via pressure equalization line 41 into output line 44 of decomposition unit 32, and from there to consumer 45. If consumer 45 is a fuel cell battery, the hydrogen peroxide solution would by-pass the decomposition unit and be placed together with oxygen in contact with the cathodes of the fuel cell battery. Since the cathode usually contains Raney silver as the electrode material, which is an excellent catalyst for the decomposition of hydrogen peroxide, it could lead to trouble in the operation of the fuel cell battery. Overflow safety device 57 contains, for example, a polypropylene float which upon the entry of hydrogen peroxide solution closes a valve and prevents the hydrogen peroxide solution from passing through.

First chamber 33 and second chamber 34 of intermediate tank 31, and decomposition unit 32 can include overpressure valves (58, 59 and 60, respectively), i.e., safety valves which protect the system against overpressurization.

In order to commence operation of the oxygen generator, shut-off valve 38 is opened, whereupon the hydrogen peroxide solution flows from supply tank 30, which is located for example, about 1 meter higher than intermediate tank, into intermediate tank 31 and thereafter to decomposition unit 32 where it is catalytically decomposed. Shut-off valve 61 is also in the open position. Since the system is in the start-up condition it is still at pressures below full operational pressure, and accordingly flow control valve 43 is open. First chamber 33 of intermediate tank 31 is in communication with ambient pressure via three-way valve 39, i.e., this chamber is vented.

Increased gas pressure is generated in pressure equalization line 41 due to oxygen being formed in the decomposition reaction taking place in decomposition unit 32. The oxygen is stored or only partially fed to consumer 45. The prevailing gas pressure then acts via line 40 on the liquid in chamber 34, but not on the liquid in chamber 33, since three-way valve 39 seals off pressure equalization line 41 from chamber 33. Due to the increased pressure in chamber 34, as compared to chamber 33, check valve 48 for the liquid closes and the supply of hydrogen peroxide solution into chamber 34 from chamber 33 is interrupted. However, hydrogen peroxide solution flows from supply tank 30 as before, to first chamber 33 of intermediate tank 31 as well as from second chamber 34 of intermediate tank 31 to decomposition unit 32, where the decomposition reaction continues.

Further increased gas pressure in pressure equalization line 41 acts on pneumatically operated flow control valve 43 via line 42 to close valve 43. The flow of hydrogen peroxide solution to decomposition unit 32 is thereby halted and the decomposition reaction is interrupted.

When chamber 33 is filled with hydrogen peroxide solution, three-way valve 39 is actuated by float 39a and is switched over. Thereby, the pressure prevailing in pressure equalization line 41 now is permitted to act on the liquid in chamber 33. Due to this increase in pressure, check valve 47 closes and the supply of hydrogen peroxide solution is stopped. Since there is pressure equalization between the two chambers of intermediate tank 31, check valve 48 simultaneously opens, enabling hydrogen peroxide solution to flow into chamber 34 which contains less liquid than chamber 33.

Pneumatically operated flow control valve 43 opens once more, if consumer 45 which is a fuel cell battery, for example, is now connected into the system or more oxygen is fed to consumer 45, and the decomposition reaction is started anew due to the decreasing gas pressure.

The period of operation proceeds in the manner already described for the embodiment of the apparatus according to FIG. 1, and will, therefore, be described here only briefly. If the hydrogen peroxide solution in chamber 33 is almost used up, float 39a actuates three-way valve 39. The connection to pressure equalization line 41 is thereby interrupted and chamber 33 of intermediate tank 31 is vented, so that the gas in it is decompressed. As a result, check valve 47 opens again and hydrogen peroxide solution flows from supply tank 30 into chamber 33. Meanwhile, chamber 34 remains under pressure, since the pressure drops in chamber 33 and check valve 48 closes. As chamber 34 is still kept under pressure via pressure equalization line 41 and line 40, the decomposition continues undisturbed. If the upper filling level is reached in chamber 33, float 39a again switches three-way valve 39 and chamber 33 is again pressurized. Check valve 48 opens again and check valve 47 closes. During the entire refilling process the decomposition reaction continues, while pneumatically operated flow control valve 43 regulates the flow of hydrogen peroxide solution to decomposition unit 32. Also, in this embodiment of the apparatus for carrying out the method according to the invention, check valve 46 regulates the system in the event of pressure fluctuations occurring during operation. Pressures are equalized via pressure equalization line 41 (through the operation of check valve 46) and do not act on the liquid in line 36.

The embodiment last described, in which second chamber 34 of intermediate tank 31 is connected to pressure equalization line 41 by means of line 40, has several advantages over the first-mentioned embodiment in which check valve 20 for gas is arranged between (see FIG. 1) first chamber 13 of the intermediate tank 11 and second chamber 14 of the same tank. Because of the more rapid pressure equalization obtainable through line 40 (see FIG. 2) the embodiment of FIG. 2 is preferred. Due to ever present pressure equalization mechanisms between chamber 34 and pressure equalization line 41, this embodiment of the apparatus also has a shorter starting time. Moreover, the decomposition is more uniform during the refilling phase of first chamber 33 of intermediate tank 31.

In the oxygen generators described, a tank of aluminum with a purity of 99.5% serves, preferably as supply tank 10 or 30. The tank is etched (pickled) and inactivated with small amounts of ammonium nitrate (a few parts per million) which may be added to the hydrogen peroxide solution. Hydrogen peroxide solution can be stored in such a tank for a period of several years. Furthermore, it is advantageous if all connections and feed lines associated with the supply tank are made of the same material as the supply tank itself, or are made of plastic. Local cells which could cause decomposition of the hydrogen peroxide are thereby prevented from forming.

Intermediate tank (11 or 31) is advantageously made of high-alloy steel and is subsequently pickled and inactivated. The intermediate tank can be cylindrical; it is, for example, 420 mm long and has a diameter of about 220 cm. The volume of the second chamber (14 or 34) of the intermediate tank is about one-quarter of the volume of the entire intermediate tank. The working volume of the first chamber (13 or 33) of the intermediate tank may be between about 3.5 and 5.5 liters. The working volume is the volume between the lower and the upper switching point of the float, i.e., that volume which is transferred to the decomposition unit (12 or 32) during one operating period. The float (19a or 39a) arranged in this first chamber of the intermediate tank consists preferably of polypropylene. Polypropylene is resistant to hydrogen peroxide; it has a density of about 0.9 g/cm$^3$ and 70% hydrogen peroxide has a density of about 1.3 g/cm$^3$ which provides assurance for satisfactory functioning of the float.

If the working volume of the first chamber of the intermediate tank is, for instance, 3.5 liters and if 7 liters of the hydrogen peroxide solution are consumed per hour, the refill operation from the supply tank to the intermediate tank takes place about every 30 minutes. The refilling operation takes about 2 to 3 minutes. With complete decomposition, more than 2 m$^3$ of oxygen are generated from 7 liters of 70% aqueous hydrogen peroxide, i.e., about 2 m$^3$ of oxygen can be produced per hour.

Figure 3:
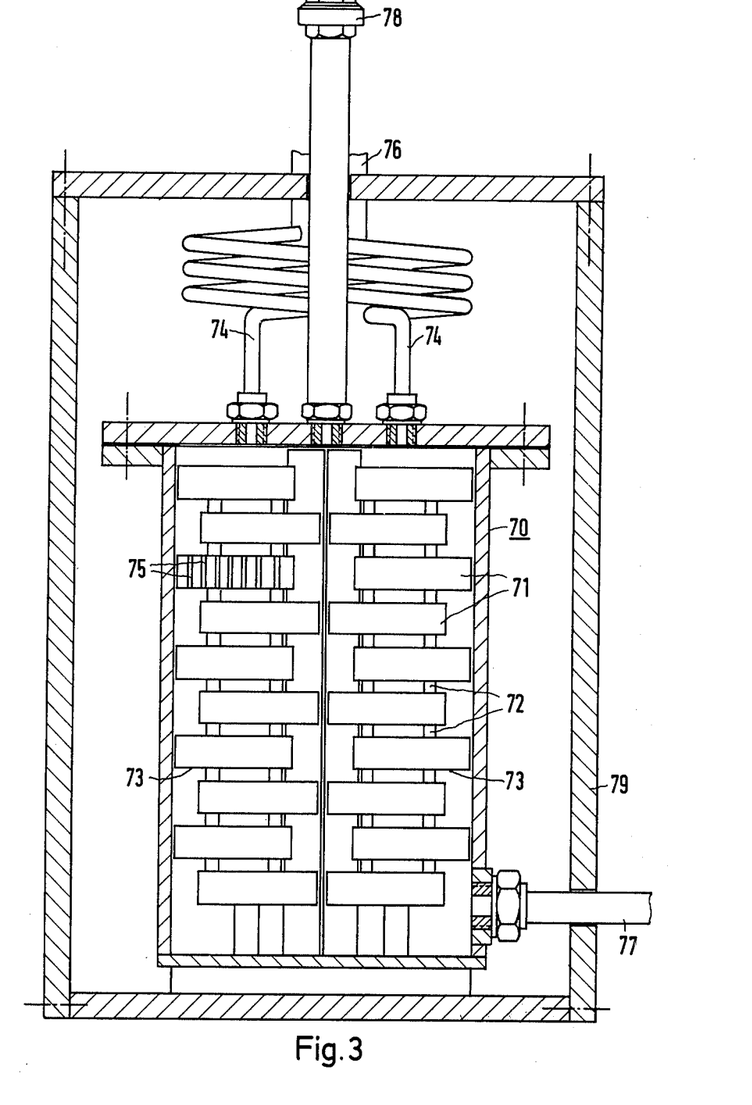
FIG. 3 is a cross-sectional view of the decomposition unit.

As already mentioned, a mixed oxide catalyst can advantageously be used in the decomposition unit. The catalyst in this case is advantageously applied on a catalyst carrier. Porous sintered blocks, for example, aluminum oxide ceramic material or aluminum silicate, preferably provided with passage openings in the form of holes, can be used to advantage as the catalyst carrier. The holes, which are present in the preferably plate-shaped sintered blocks, in addition to the pores, are advantageously parallel to each other and go completely through the sintered blocks. They facilitate the run-off of the water formed in the decomposition reaction as well as the escape of the oxygen. The holes may, for example, have a diameter of about 1 mm and there may be about 40 to 50 holes on each square centimeter of each major surface of a sintered block. In FIG. 3, the holes are indicated by numeral 75.

In FIG. 3, an embodiment of decomposition unit 70 is shown by way of example. The catalyst carriers 71, for example, sintered blocks provided with the catalytic material, are arranged on top each other in the decomposition unit and are separated by spacers 72 which may be insulating beads, preferably of ceramic material. In this manner a free space is created through which the oxygen can flow unimpeded and the water can run off. Four such columns 73 of sintered blocks can be arranged in decomposition unit 70 and are supplied with hydrogen peroxide solution. Columns 73 may be in parallel. The hydrogen peroxide solution is fed to columns 73 through helically wound lines 74. The housing material for the decomposition unit may be high-alloy chrome-nickel steel. The line by which decomposition unit 70 is connected to the intermediate tank, is designated as numeral 76. Lines 74 branch off from line 76. Lines 74 carry hydrogen peroxide solution to catalyst carrier columns 73. The reference numeral 77 designates the output line of decomposition unit 70. Water and water vapor, respectively, and oxygen are carried through line 77 of the decomposition unit to the heat exchanger.

Decomposition unit 70 is equipped with overpressurization valve 78.

For thermal insulation decomposition unit 70 may be enclosed within tank 79, preferably made of asbestos cement. An example of a suitable decomposition unit is described in the German Published Patent Application 1,956,726.

Figure 4:
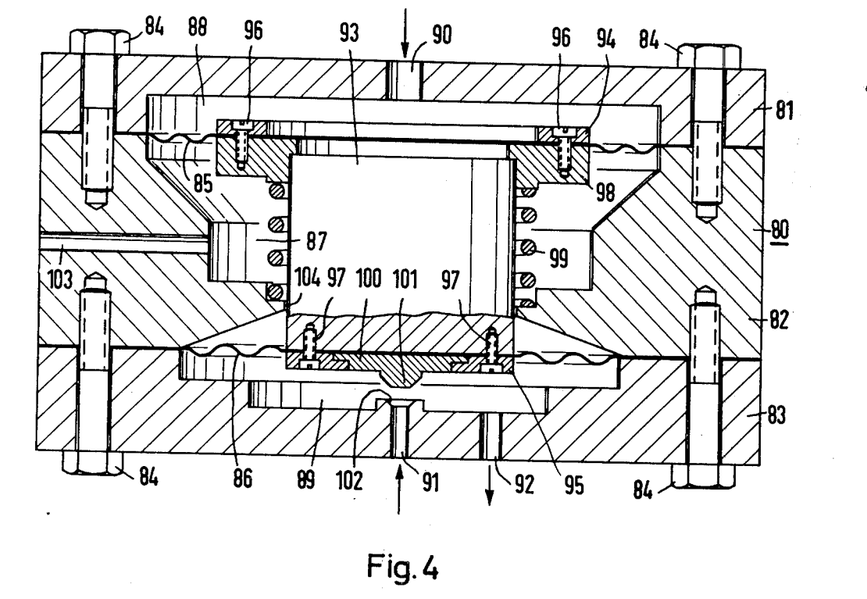
FIG. 4 is a cross-sectional view of the flow control valve used in the apparatus of the invention.

The previously mentioned flow control valve is shown in FIG. 4. In this flow control valve the medium to be controlled, i.e., the medium whose flow or volume is controlled is hermetically separated from the controlling medium by two diaphragms. This obviates the necessity for sealing-off any parts that move relative to each other in the valve. This results in the advantage that seals are no longer necessary, and most importantly, the disadvantages and problems associated with seals are eliminated. Thus, minimal frictional forces develop in this volume control valve since the use of diaphragms obviates the need for sealing off parts which move relative to each other. Thereby, the hysteresis of the valve is small and the valve operates in response to small pressure changes, for instance, in response to pressure changes of about $\pm 10^{-3}$ N/mm$^2$. Due to the absence of moving mechanical parts, thus eliminating frictional contact, further advantages result from this flow control valve if it is used to control corrosive or easily decomposed media, such as, for example, in controlling the flow of hydrogen peroxide solution to the hydrogen peroxide decomposition unit. It therefore assures leak-free operation.

The flow control valve can be operated pneumatically or hydraulically, i.e., gases or vapors as well as liquids can be used as the controlling medium. The two diaphragms of the valve are advantageously connected with each other by a rod through which forces are transmitted. The rod is provided with a return spring. The return spring can advantageously be designed as a helical spring situated in the third chamber; it rests with one end on a projection of the housing and acts on the rod with its other end. The spring force of the return spring is preferably adjustable.

In such a flow control valve at least one of the apertures which open into the second chamber can advantageously be designed as a valve seat at its opening. A valve cone fitting this valve seat can be attached at the diaphragm closing off the second chamber from the third chamber. If two apertures open into the second chamber, that aperture through which the liquid is fed into this chamber is preferably designed as a valve seat at its opening. If the second chamber has more than two apertures, one of them preferably serves to feed in the liquid, while the liquid is removed through the other openings. In this manner, liquid can be fed by means of the flow control valve, for instance, to several consumers simultaneously.

The two diaphragms of the volume control valve have different effective areas. Effective area is understood as meaning that area of the diaphragm on which the pressure of the respective media acts. The relative ratio of the effective areas of the two diaphragms depends on the desired control range of the flow control valve. If the control range is, for instance, between about 24 N/cm$^2$ and 40 N/cm$^2$, the effective areas are about 40 cm$^2$ and 30 cm$^2$ respectively. Similarly, the force of the spring depends on the desired control range of the volume control valve. For the control range mentioned above, a helical spring with a spring constant of about 30 N/mm may be used. The spring expansion is about 2 mm.

The diaphragm, like the other parts of the flow control valve, must be resistant to attack by the media with which they come into contact. It has been found to be advantageous to use diaphragms which consist of polytetrafluorethylene. This applies particularly if a liquid like hydrogen peroxide solution is to be controlled. However, other materials can also be used which are selected specifically for the respective medium.

An example of a flow control valve which is particularly well suited for applications in which the medium to be controlled and the controlling medium have the same pressure, will hereinafter be explained in detail with reference to FIG. 4.

Valve housing 80 of the flow control valve consists of three structural parts: upper part 81, central part 82 and lower part 83, which are held together by means of screws 84. In the assembly of the valve, diaphragm 85 is placed between parts 81 and 82, and diaphragm 86 between parts 82 and 83. The diaphragms preferably are made of polytetrafluorethylene, while corrosionresistant steel is used for the other parts of the control valve.

Central part 82 has a large through opening which is closed on its upper and lower sides by diaphragms 85 and 86, thereby creating chamber 87. Chamber 87 is connected with ambient pressure via narrow canal 103 in the wall of central part 82 and thus has a buffer effect. Upper part 81 and lower part 83 each have a recess which is closed by diaphragm 85 and 86, respectively, thereby creating chambers 88 and 89, respectively. The controlling medium is received in chamber 88 and the controlled medium is received in chamber 89. The controlling medium is fed into chamber 88 via opening 90 in upper part 81. The medium to be controlled is fed and discharged from chamber 89 via two openings 91 and 92 respectively, in lower part 83. The opening of aperture 91 into chamber 89 is designed as valve seat 102.

Rod 93 is situated in chamber 87 and is connected to both diaphragms 85 and 86. For this purpose the diaphragms are located at each end of the rod and covered by cover rings 94 and 95 respectively. The cover rings are then fastened to rod 93 by means of screws 96 and 97. In the embodiment of the flow control valve shown in FIG. 4, cover ring 94 is not directly attached to rod 93 but is connected by screws 96 through adjustment ring 98 to rod 93 by threading on ring 98. Diaphragms 85 and 86 move in response to movement of rod 93 as shown in the Figure.

Rod 93 is provided with spring 99 which rests with one end against adjustment ring 98 and with the other end on a projection of housing 104, i.e., on a portion of central part 82 which protrudes into chamber 87. Cover plate 100 is attached to one end of rod 93 together with cover ring 95. Cover plate 100 is provided with a shaped protrusion, namely, valve cone 101 that fits valve seat 102.

In controlling the flow of hydrogen peroxide solution to a decomposition unit in which the hydrogen peroxide is catalytically decomposed into oxygen and water, the oxygen which is formed in the decomposition unit and is fed to chamber 88 is advantageously used as the controlling medium. The medium to be controlled, i.e., the hydrogen peroxide solution flows through chamber 89. In the oxygen generator, according to the invention, the oxygen and the hydrogen peroxide solution have the same pressure because of the pressure feedback. The pressure feedback is applied in order to facilitate automatic operation of the oxygen generator and in order to avoid the use of auxiliary energy.

The flow of the hydrogen peroxide solution through the valve or chamber 89, respectively, is unimpeded when first put in operation. At a pressure of about 24 N/cm² and increasing from that value, the free flow cross section of the medium to be controlled is reduced in chamber 89 due to the increasing pressure, i.e., rod 93 moves in the direction of valve seat 102. The reason for this is that the control force for the valve depends on the prevailing pressure; on the difference in effective areas; and, on the spring force of the spring. The effective areas of the diaphragm are the respective areas of the diaphragms which are not clamped between parts 81 and 82, and 83, respectively. The control force is derived from the difference between the spring force and the force which results from the area differentials of the two diaphragms which are acted upon by the same pressure but which have different effective areas. With increasing pressure the control force acts in the direction of the valve seat; the control force is exerted via adjustment ring 98 through rod 93 to valve cone 101, thereby reducing the clearance between valve seal 102 and valve cone 101 resulting in a decrease in the flow rate of hydrogen peroxide solution through chamber 89. With decreasing pressure the direction of the control force is reversed; the spring force exceeds the force which results from the diaphragms exposed to the same pressure and the valve thereby opens again.

By rotating adjustment ring 98 the bias of the spring can be changed and the control range of the valve can thereby be altered. For this purpose, upper part 81 of the valve is lifted from center part 82 and the adjustment ring is rotated together with diaphragm 85. Diaphragms 85 and 86 have holes at the points where screws 96 and 97 come through; however, the diaphragms can also be slotted in these areas.

The flow control valve has, for example, a diameter of approximately 100 mm and a height of about 50 mm. It can be used wherever the flow of a medium is to be controlled pneumatically or hydraulically.

In the apparatus for carrying out the method according to the invention, single- or multistage plate heat exchangers can be used as the heat exchanger. The plates of the heat exchanger can be made of, for example, corrugated nickel sheets which have uncorrugated edge zones which may be sealed.

Alkali-resistant asbestos gasket material can be used as a gasket sealing agent. The plates are preferably arranged parallel to each other in the heat exchanger. The mixture of water and oxygen, and a cooling medium, such as water, flow alternatingly through the spaces between the plates, preferably in a counter-current relationship.

Known devices can be used as water separators. The water may be removed by a fine-pored diaphragm (German Patent No. 1,273,644) or through a valve which is actuated by a float. In the decomposition of say, 1.47 kg of a 70% aqueous solution of hydrogen peroxide, 0.986 kg of water are produced. This amount of water is composed of 0.545 kg of water which is produced by the decomposition reaction and 0.441 kg of water which is contained in the aqueous hydrogen peroxide solution. In order to prevent hydrogen peroxide from being removed with the water from the water separator, a sintered block to which a hydrogen peroxide decomposition catalyst has been applied may advantageously be embedded in water separator 51 (FIG. 2) or in line 52. The hydrogen peroxide content in the water can thereby be lowered to below 0.1%.

The check valves used in the oxygen generator described should operate fast and without appreciable pressure difference. As the valves are closed merely by the backward flow of the hydrogen peroxide solution, the valve discs with their guide pins are made advantageously of polypropylene so that the discs float in the hydrogen peroxide solution used.

After the oxygen generator has been started by opening the shut-off valve it takes about 1 minute until a pressure of about 30 N/cm² is developed in the system, provided that no oxygen is drained off. If oxygen is taken out immediately, the time until the overpressure is built up is about 2 minutes. The operating pressure of the oxygen generator, which adjusts itself in the equilibrium condition as a function of the consumption, varies between about 24 N/cm² and about 40 N/cm². The preferred operating temperature of the decomposition unit is about 220°C.

It will be understood that it is intended to cover all changes and modifications of the drawings and examples of the invention herein chosen for the purpose of illustration which do not constitute departures from the spirit and scope of the invention.

We claim:

1. Apparatus for producing a gas from a liquid decomposable into the gas, comprising first and second fluid-tight chambers, a gravity supply source of the liquid said gravity supply source being connected to the first chamber for gravity flow thereto through a check valve preventing reverse flow, the first chamber being connected for gravity liquid flow to the second chamber through a check-valve preventing reverse flow, means for enclosing fluid-tightly and decomposing the liquid to the gas under pressure and connected to receive a gravity liquid flow from the second chamber through a pressure-responsive flow control valve and having a gas output conduit for serving a consumer, a branch conduit connected to the output conduit and to the first and the second chamber and to said flow control valve and means responsive to the liquid level in the first chamber which vents said first chamber to control the gravity flow thereto from said source to maintain a predetermined liquid level in the first chamber.

2. The apparatus of claim 1 in which the first chamber is connected for gas flow therefrom to the second chamber above the predetermined liquid levels therein through a check valve preventing reverse flow, and said branch conduit connects with the second chamber via the first chamber and the last-named check valve above said liquid level.

3. The apparatus of claim 1 in which said pressure responsive valve connects with said decomposing means through a check valve preventing reverse flow from the decomposing means.

4. The apparatus of claim 1 in which said branch conduit connects directly with the second chamber.

5. The apparatus of claim 1 having additionally shut-off valves in the flow connection between said source and the first chamber and between the second chamber and said decomposing means.

6. The apparatus of claim 1 in which said branch conduit connects with said output conduit through a vapor condenser and a water separator.

7. The apparatus of claim 1 in which said branch conduit has means for preventing a flow of liquid from the second chamber back to the decomposing means via the gas output conduit.

8. The apparatus of claim 1 wherein said liquid level responsive means is a three way valve arranged in said branch line ahead of the point where said branch line opens into said first chamber.

9. The apparatus of claim 8 further comprising a float situated in said first chamber to operate said three-way valve.

10. The apparatus of claim 1 further comprising an overpressure valve arranged at least in one of said first chamber, said second chamber and said means for decomposing the liquid.

11. The apparatus of claim 1 further comprising a pressure-reducing device in said output conduit, said device being located after the connection with the branch conduit and prior to the consumer.

12. The apparatus of claim 1 further comprising a filter in said branch line.

13. The apparatus of claim 1 further comprising a gas reservoir in said branch line.

14. The apparatus of claim 1 wherein said means for decomposing includes at least one column of catalyst carriers, said carriers being arranged on top of each other with each carrier containing catalytic material, means for spacing said carriers apart from each other, a line connected to each column for feeding in liquid and an outlet for receiving decomposition products.

15. The apparatus of claim 14 wherein said carriers are porous sintered blocks and said means for spacing are insulating beads.

16. The apparatus of claim 15 wherein said sintered blocks are provided with passage openings running through said blocks parallel to one another.

17. The apparatus of claim 15 wherein at least one of said sintered blocks and said insulating beads consist of ceramic material.

18. The apparatus of claim 14 further comprising a tank of asbestos cement enclosing said means for enclosing and decomposing the liquid.

19. The apparatus of claim 1 wherein said flow control valve includes a housing having three chambers, a first of said chambers being adapted for receiving a controlling medium, a second of said chambers being adapted for receiving a medium to be controlled, and a third of said chambers situated between said first and second of said chambers, movable diaphragms hermetically separating said third chamber from said first and second of said chambers, the effective area of a first diaphragm closing off said first chamber for the controlling medium being larger than the effective area of a second diaphragm closing off said second chamber for the medium to be controlled, said two diaphragms being rigidly connected with each other for force transmission therebetween, said first chamber having an opening for feeding in the controlling medium; at least two further openings being provided for passing the medium to be controlled through said second chamber whereby a change in position of said second movable diaphragm varies the clear flow cross section of the medium to be controlled in said second chamber.

20. The apparatus of claim 19 further comprising a post connecting said two diaphragms with each other and a return spring biasing said post towards said first chamber.

21. The apparatus of claim 20 wherein said return spring is a helical spring arranged in the third chamber and wherein said flow control valve has a housing including a projection abutting one end of said spring with the opposite end of said spring abutting said post.

22. The apparatus of claim 20 wherein said spring is adjustable by means of an adjustment ring connected to said post.

23. The apparatus of claim 19 wherein at least one of said two apertures opening into said second chamber forms a valve seat and wherein a valve cone for seating in said valve seat is secured to said second diaphragm.

24. The apparatus of claim 19 wherein each said diaphragm is made of polytetrafluorethylene.

* * * * *